H. SCHMITT.
PISTON RING.
APPLICATION FILED SEPT. 20, 1917.

1,276,832.

Patented Aug. 27, 1918.

Witness
Charles Balg
Karl H. Butler

Inventor
Henry Schmitt.
By
[signature]
Attorneys

UNITED STATES PATENT OFFICE.

HENRY SCHMITT, OF DETROIT, MICHIGAN.

PISTON-RING.

1,276,832.  Specification of Letters Patent.  Patented Aug. 27, 1918.

Application filed September 20, 1917. Serial No. 192,315.

*To all whom it may concern:*

Be it known that I, HENRY SCHMITT, a citizen of the United States of America, residing at Detroit, in the county of Wayne and State of Michigan, have invented certain new and useful Improvements in Piston-Rings, of which the following is a specification, reference being had therein to the accompanying drawings.

This invention relates to piston rings, and has special reference to that class of rings which are split and are adapted to be mounted in grooves or seats provided therefor in a piston operatable in a cylinder.

My invention aims to provide a novel coupling member for the split ends of a piston ring, to prevent lateral displacement of the ends of the ring and close a gap therebetween. The coupling member is of novel design and is fixed to one end of the ring so that the other end of the ring may slide thereon, said coupling member closing the gap between the split ends of the ring and yet permitting of the expansive force of the ring maintaining the same in snug engagement with the walls of a cylinder.

My invention also includes the manner of preparing the ends of the split ring so as to receive the coupling member, all of which contributes to the low cost and efficiency of the ring.

The piston ring will be hereinafter specifically described and then claimed, and reference will now be had to the drawing, wherein—

Figure 1:
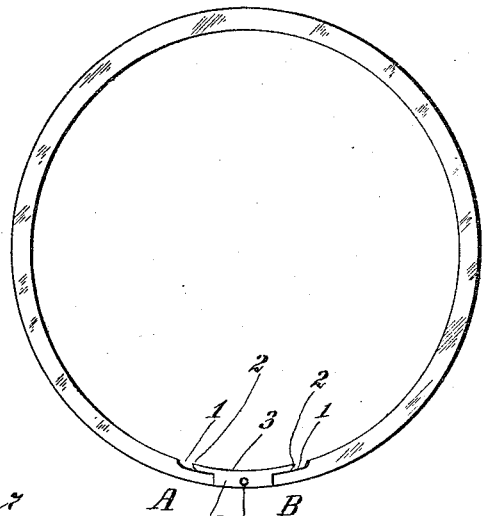
Figure 1 is a plan of the piston ring.

The piston ring comprises an annulus or band that is cut on a bias or at an angle to provide split ends generally designated A and B, and the inner wall of the ring, and split ends thereof, is cut away, as at 1 so as to provide clearance for the ends 2 of a coupling member 3. The coupling member 3 is made of a single piece of metal, as brass, and one of the longitudinal edges of said member is formed with an outstanding dove-tailed tongue 4 and at the opposite edge of said member is an outstanding flange 5 having a central opening 6.

Figure 2:
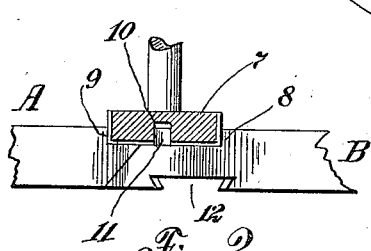
Fig. 2 is a side elevation of a portion of the ring, showing the manner of forming the ends thereof.
Figure 3:
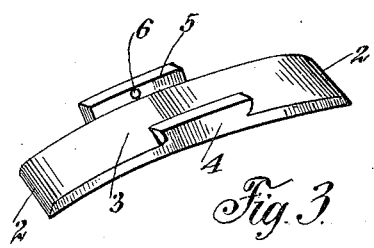
Fig. 3 is a perspective view of a detached coupling member on a large scale.
Figure 4:
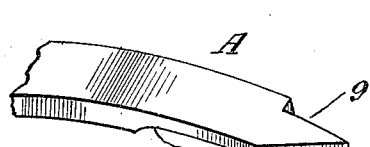
Figs. 4 and 5 are perspective views of the ends of the ring.
Figure 5:
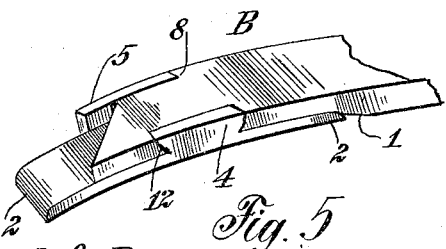
Figure 6:
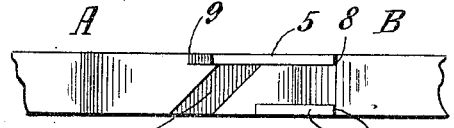
Fig. 6 is a side elevation of a portion of the ring, showing the split ends thereof.

With the split ends of the ring in abutting relation, as shown in Fig. 2, a rotary cutter 7 or other suitable tool is employed for providing one face of the ring with recesses 8 and 9 at the split ends of the ring and said cutter has a central cavity 10 to provide clearance for the formation of a pin 11 during the formation of the recesses 8 and 9. The cutter 7 in operating on the face of the ring removes portions thereof during the formation of the recesses 8 and 9 and leaves the outstanding pin 11 on the end B of the ring.

The same tool or any other tool may be employed for providing the opposite face of the ring, at the end B, with a dove-tail groove or slot 12 and this groove or slot is adapted to receive the tongue 4. After placing the tongue 4 in the groove 12, the flange 5 is bent into the recess 8, the pin 11 extending through the opening or aperture 6 of said flange. The coupling member is then held against accidental displacement and the end A of the ring can readily ride on said coupling member. The recess 9 of the end A provides clearance for the outer end of the flange 5 which is not seated in the recess A of the end B, and in consequence of this construction, the ends A and B can be brought into engagement with each other so that the ring will be closed, but when the ends A and B slightly separate to permit of the ring snugly engaging the walls of the cylinder, the coupling member 3 seals the joint or gap between the ring ends and prevents leakage at this point.

One embodiment of my invention has been illustrated, and it is to be understood that the structural elements are susceptible to such changes as fall within the scope of the appended claims.

What I claim is:—

1. A piston ring comprising an annulus having separable ends and the inner wall thereof at said ends cut away, said annulus having both faces thereof at one end provided with recesses, one of said recesses being dovetailed, an uninterrupted coupling member engaging in the cut away ends of said annulus and having a dovetailed tongue fitted in the dovetailed recess of said annulus, and a flange carried by said coupling member and fitted in the other recess of said annulus, said flange and said tongue coöperating and retaining said coupling member in place.

2. A piston ring comprising an annulus having split ends, one face of said ring having the ends thereof formed with recesses providing a pin on the face of said annulus at one end thereof, the other face of the annulus having a dovetailed groove therein, a coupling member having a dove-tailed tongue to engage in the dove-tailed groove of said annulus, and a flange on said coupling member adapted to be bent into engagement with the pin of said annulus.

3. A piston ring comprising an annulus having spilt ends, one face of said ring provided with recesses in both ends thereof, the other face of said ring at one end thereof having a dove-tailed groove, a coupling member having the ends thereof engaging the inner wall of said annulus, a dove-tailed tongue carried by said coupling member and engaging in the dove-tailed groove of said annulus, a flange on said coupling member adapted to be bent into the recess at one end of said annulus, and means adapted for retaining the flange therein.

In testimony whereof I affix my signature in the presence of two witnesses.

HENRY SCHMITT.

Witnesses:
 KARL H. BUTLER,
 ANNA M. DORR.

Copies of this patent may be obtained for five cents each, by addressing the "Commissioner of Patents, Washington, D. C."